(12) United States Patent
Cherenfant

(10) Patent No.: US 10,505,575 B1
(45) Date of Patent: Dec. 10, 2019

(54) SMART WEARABLE ACCESSORY

(71) Applicant: Waterloo Cherenfant, Pompano Beach, FL (US)

(72) Inventor: Waterloo Cherenfant, Pompano Beach, FL (US)

( * ) Notice: Subject to any disclaimer, the term of this patent is extended or adjusted under 35 U.S.C. 154(b) by 0 days.

(21) Appl. No.: 16/244,260

(22) Filed: Jan. 10, 2019

(51) Int. Cl.
| G06F 3/16 | (2006.01) |
| H04B 1/3827 | (2015.01) |
| A41F 9/00 | (2006.01) |
| A44C 5/00 | (2006.01) |
| G08B 21/18 | (2006.01) |
| G08B 21/24 | (2006.01) |
| H04B 1/3883 | (2015.01) |

(52) U.S. Cl.
CPC ............ *H04B 1/385* (2013.01); *A41F 9/002* (2013.01); *A44C 5/0015* (2013.01); *G08B 21/182* (2013.01); *G08B 21/24* (2013.01); *H04B 1/3883* (2013.01); *H04B 2001/3855* (2013.01)

(58) Field of Classification Search
CPC ................. H04B 1/385; H04B 1/3883; H04B 2001/3855; A41D 1/005; A41F 9/002; A44C 5/0015; G06F 1/163; G08B 21/182; G08B 21/24; G08B 21/0266; F41H 13/00
See application file for complete search history.

(56) References Cited

U.S. PATENT DOCUMENTS

| 8,768,294 | B2 | 7/2014 | Reitnour et al. | |
| 9,445,633 | B2 * | 9/2016 | Tulloch | H01R 31/06 |
| 9,581,972 | B1 * | 2/2017 | Arrow | H01M 10/425 |
| 9,742,085 | B2 * | 8/2017 | Tulloch | H01R 31/06 |
| 2009/0082835 | A1 * | 3/2009 | Jaax | A61N 1/3787 607/61 |
| 2009/0243892 | A1 * | 10/2009 | Cheung | A44B 11/2569 340/945 |
| 2015/0137731 | A1 * | 5/2015 | Kim | H02J 7/355 320/101 |
| 2015/0241922 | A1 * | 8/2015 | Farjami | G06F 1/1635 361/679.03 |
| 2015/0378391 | A1 * | 12/2015 | Huitema | G06F 1/163 361/679.03 |
| 2016/0088880 | A1 * | 3/2016 | Tulloch | H01R 31/06 439/37 |
| 2017/0235341 | A1 * | 8/2017 | Huitema | G06F 1/163 361/679.03 |

(Continued)

*Primary Examiner* — An T Nguyen
(74) *Attorney, Agent, or Firm* — Sanchelima & Associates, P.A.; Christian Sanchelima; Jesus Sanchelima

(57) ABSTRACT

The present invention is disclosing a smart wearable accessory that comprises a belt portion and a buckle portion. Belt portion has a first end and a second end, and comprises a first set of output devices positioned at one or more points. Buckle portion has a housing upon which a mobile device is mounted. Housing comprises one or more sensors that generate a signal when non-contact time duration of said mobile device unmounted from said housing exceeds a first threshold value, and proximity distance between said one or more sensors and said unmounted mobile device exceeds a second threshold value. Housing further comprises a charging terminal that is electrically connectable with said mobile device, and a second set of output devices. Housing further comprises a microprocessor that activates said first and/or said second set of output devices based on said signal received from said one or more sensors.

11 Claims, 4 Drawing Sheets

(56) References Cited

U.S. PATENT DOCUMENTS

| | | | |
|---|---|---|---|
| 2017/0264037 A1* | 9/2017 | Tulloch | H01R 31/06 |
| 2017/0337033 A1* | 11/2017 | Duyan | G06F 3/165 |
| 2018/0229045 A1* | 8/2018 | McDonald | A61N 1/3787 |
| 2018/0290005 A1* | 10/2018 | Sato | A63B 21/065 |
| 2018/0361165 A1* | 12/2018 | Jaax | H02J 50/10 |
| 2019/0033043 A1* | 1/2019 | Piccioni | A45F 5/021 |
| 2019/0037946 A1* | 2/2019 | Cheng | A41F 9/002 |
| 2019/0213860 A1* | 7/2019 | Shaprio | G08B 21/0266 |

* cited by examiner

SMART WEARABLE ACCESSORY

BACKGROUND OF THE INVENTION

1. Field of the Invention

The present disclosure relates to a smart wearable accessory. More particularly, the present disclosure relates to a smart wearable accessory upon which a mobile device is mounted or unmounted.

2. Description of the Related Art

Smart devices have become an integral part of day-to-day life. The most common ones are mobile phone that users always carry with them. However, in certain instances it may so happen that a user forgets to carry the mobile phone or leaves the mobile phone behind while busy in some other task. A lot of time may be wasted and productivity of other tasks may be hampered due to time spent in tracking or finding the mobile phone.

Several designs of smart apparatuses have been presented in the past. None of them, however, presents a simple and smart wearable accessory that is user friendly, simple to use, and a great alerting device when the mobile device is not mounted on the smart wearable accessory.

Applicant believes that a related reference corresponds to U.S. Pat. No. 8,768,294B2 by Philip A. Reitnour et al. that discloses a server for tracking and providing emergency notifications for a plurality of mobile devices. Virtual boundaries of a geographic area to be monitored are defined. The server receives a communication from one of said plurality of mobile devices indicating a user of that mobile device is involved in an emergency situation. The server determines from the GPS coordinates and the defined boundaries of the geographic area to be monitored that the mobile device from which the communication was received is located in that geographic area. The server then displays the location of the mobile device on an image of the geographic area being monitored. However, such tracking of mobile devices requires a well-established infrastructure and may be very costly for a user.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a smart wearable accessory, comprising a belt portion and a buckle portion. Belt portion has a first end and a second end, and may comprise a first set of output devices positioned at one or more points at belt portion. Buckle portion may have a housing in which a mobile device is mounted. Housing may comprise one or more sensors configured to generate a signal when non-contact time duration of mobile device unmounted from housing exceeds a first threshold value, and proximity distance between one or more sensors and unmounted mobile device exceeds a second threshold value. Housing may further comprise a charging terminal configured to be electrically connectable with mobile device, a second set of output devices positioned at buckle portion, and a microprocessor configured to activate one or both of first set of output devices and second set of output devices based on signal received from one or more sensors. In various embodiments, the smart wearable accessory may be worn by a user as a waist belt or as an arm belt. The smart wearable accessory may also be waterproof to prevent damage in the water.

In an embodiment, buckle portion has at least two parallel opposite edges, wherein a first edge may be adjustably secured with first end of belt portion and a second edge may be adjustably secured with second end of belt portion.

In an embodiment, one or more sensors may be positioned at a proximal surface of housing, wherein proximal surface of housing may be configured to be abutted with a back surface of mobile device.

In an embodiment, housing may be positioned at proximal surface of buckle portion. In another embodiment, housing may be positioned at distal surface of buckle portion.

In an embodiment, smart wearable accessory may comprise a deactivation button configured to be manipulated when mobile device is mounted within housing. Manipulation of deactivation button may deactivate the activated one or both of first set of output devices and second set of output devices. Deactivation button may be automatically or manually manipulated upon mounting mobile device in housing.

In an embodiment, smart wearable accessory may further comprise a rechargeable battery pack that may be installed on belt portion and configured to supply power to charging terminal.

In an embodiment, one or more other devices may be communicatively coupled with mobile device via a communication network. Communication network may be one of a long distance communication network or a short distance communication network.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
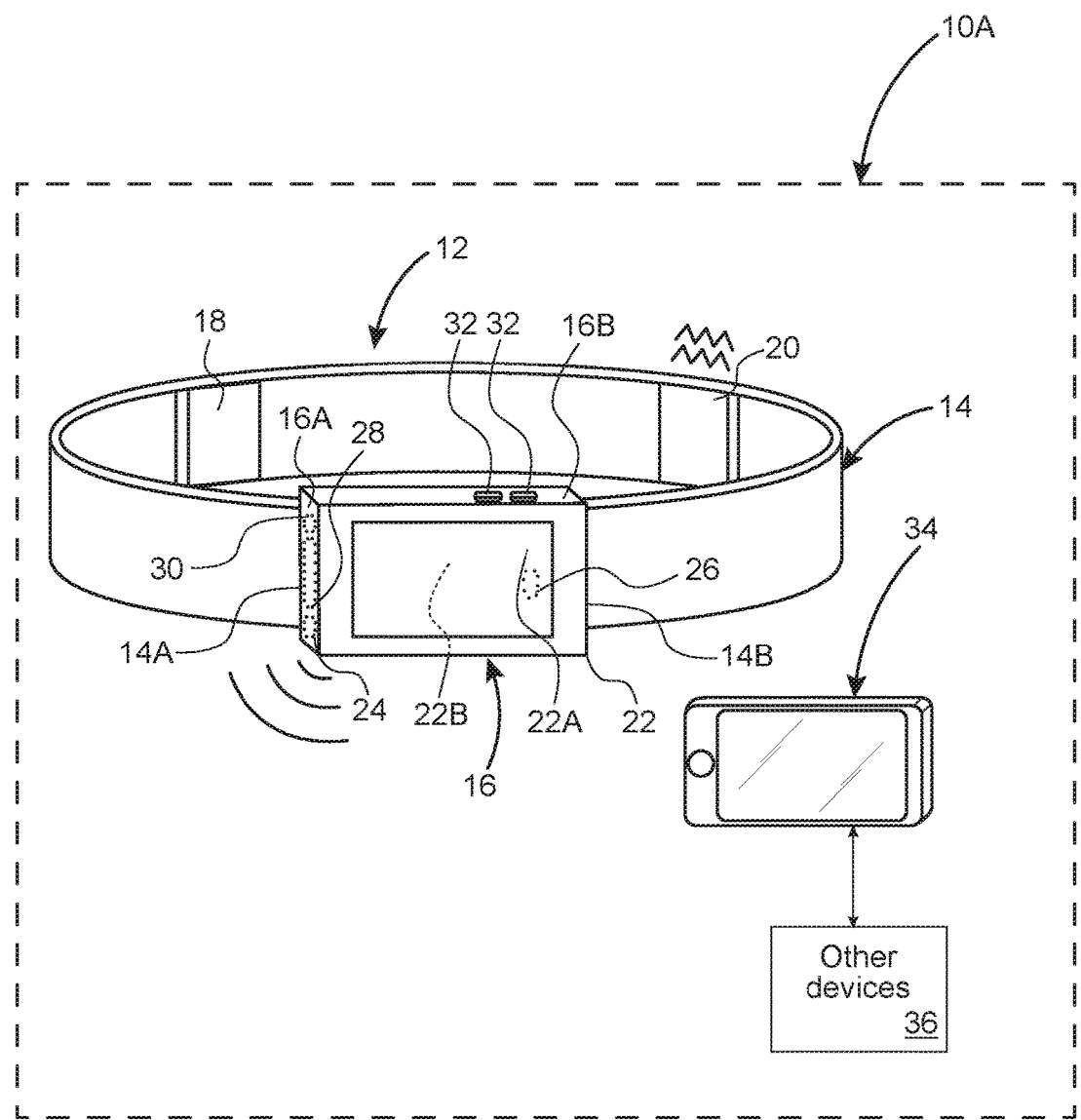
FIG. 1 represents a smart wearable accessory 12 of present invention in its first operating environment 10A, according to an embodiment described herein.

Referring now to the drawings, FIGS. 1-4, where the present invention is generally referred to with numeral 12, it can be observed that an interactive monitoring system, in accordance with one embodiment, is provided that includes various components, a described hereinafter.

FIG. 1 illustrates smart wearable accessory 12 of the present invention in its first operating environment 10A, according to an embodiment described herein. Smart wearable accessory 12 may include a belt portion 14 and a buckle portion 16. Belt portion 14 has a first end 14A and a second end 14B. Further, belt portion 14 may comprise a battery pack 18 and a first set of output devices 20 positioned at one or more points at belt portion 14.

Buckle portion 16 may be of a specific shape having at least two parallel edges 16A and 16B. First edge 16A is adjustably secured with first end 14A and second edge 16B is adjustably secured with second end 14B of belt portion 14. As shown in FIG. 1, buckle portion 16 is of a rectangular shape. However, it may be noted that buckle portion 16 may be of some other shape also, such as square, hexagonal, and the like, without any deviation from the scope of the disclosure.

Buckle portion 16 has a housing 22 having a proximal surface 22A and a distal surface 22B. Buckle portion 16 may comprise a second set of output devices 24, such as an audio beeper, one or more sensors 26, a charging terminal 28, a deactivation button 30, and one or more buttons 32. One or more sensors 26 may be positioned at distal surface 22B of housing 22. Distal surface 22B of housing 22 may be further configured to be abutted with a back surface or front surface of mobile device 34. It may be noted that color of covering of back surface of mobile device 34 may be of same color as belt portion 14. In an embodiment, housing 22 may be secured with proximal surface of buckle portion 16. In another embodiment, housing 22 may be secured with distal surface of buckle portion 16. It may be noted that housing 22 may be detachable and may be adjusted on any type of buckle portion or belt portion of another belt accessory, via various securing means, such as a hook structure, known in the art. One or more buttons 32 may be configured to be manipulated by user for various operations, such as power on/off, volume on/off, haptic feedback on/off, and the like.

Referring to first operating environment 10A in FIG. 1, there is shown mobile device 34 which is not mounted in housing 22. First operating environment 10A may correspond to a situation when a user has forgotten to pick his mobile device 34 while leaving his place. In such situation, one or more sensors 26 may be configured to generate a signal when non-contact time duration of mobile device 34 unmounted from said housing 22 exceeds a first threshold value, and proximity distance between unmounted mobile device 34 and one or more sensors 26 exceeds a second threshold value. Accordingly, one or both of first set of output devices 20 and second set of output devices 24 may be activated based on signal received from one or more sensors 26. For example, first set of output devices 20 may include a haptic device that may start generating haptic feedback upon activation by microprocessor 38 (described in FIG. 3). Further, second set of output devices 24 may include an audio beeper that may be generating beeps upon activation by microprocessor 38.

In an embodiment, for a first time duration, feedback signal may be of a specific intensity and rendering pattern. However, at second greater time duration, feedback signal may be of an increased intensity and different rendering pattern. In an embodiment, user may manually manipulate deactivation button 30 to deactivate the activated one or both of said first set of output devices 20 and second set of output devices 24.

However, in an alternate embodiment, first operating environment 10A may correspond to another situation when user has willingly unmounted mobile device 34 from housing 22 to perform a task, such as placing a call, attending a call, typing a message, interacting with an app, or the like. In such situation, non-contact time duration of mobile device 34 unmounted from said housing 22 exceeds first threshold value, however proximity distance between unmounted mobile device 34 and one or more sensors 26 remains within second threshold value, as user is holding mobile device 34 in his hands. Accordingly, first set of output devices 20 and second set of output devices 24 remain deactivated as no signal is received from one or more sensors 26.

Figure 2:
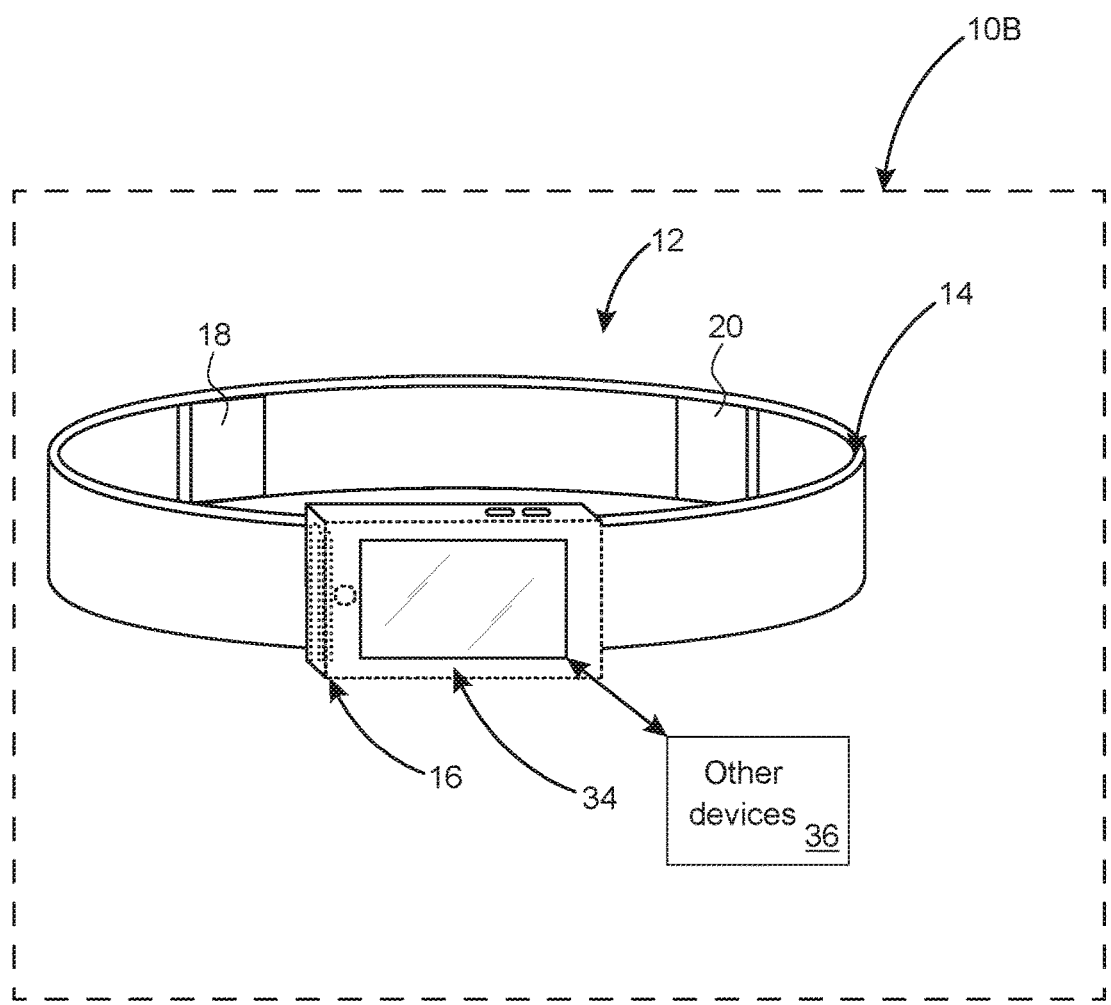
FIG. 2 represents smart wearable accessory 12 of present invention in its second operating environment 10B, according to an embodiment described herein.

FIG. 2 illustrates smart wearable accessory 12 of the present invention in its second operating environment 10B, according to an embodiment described herein.

Referring to second operating environment 10B, there is shown mobile device 34 which is mounted in housing 22. Second operating environment 10B may correspond to a situation when user has mounted mobile device 34 in housing 22. In such situation, deactivation button 30 is automatically manipulated by front or back side of mobile device 34 and first set of output devices 20 and second set of output devices 24 remain deactivated. Further, mobile device 34 may be charged by charging terminal 28 which is further electrically coupled with rechargeable battery pack 18 installed on belt portion 14 and configured to supply power to charging terminal 28. Further, in an embodiment, one or more other devices 36 may be communicatively coupled with mobile device 34 via a communication network (not shown). Communication network may be one of a long distance communication network or a short distance communication network. For example, one or more other devices 36, such as a set of earphones, may be paired with mobile device 34 via Bluetooth network.

Figure 3:
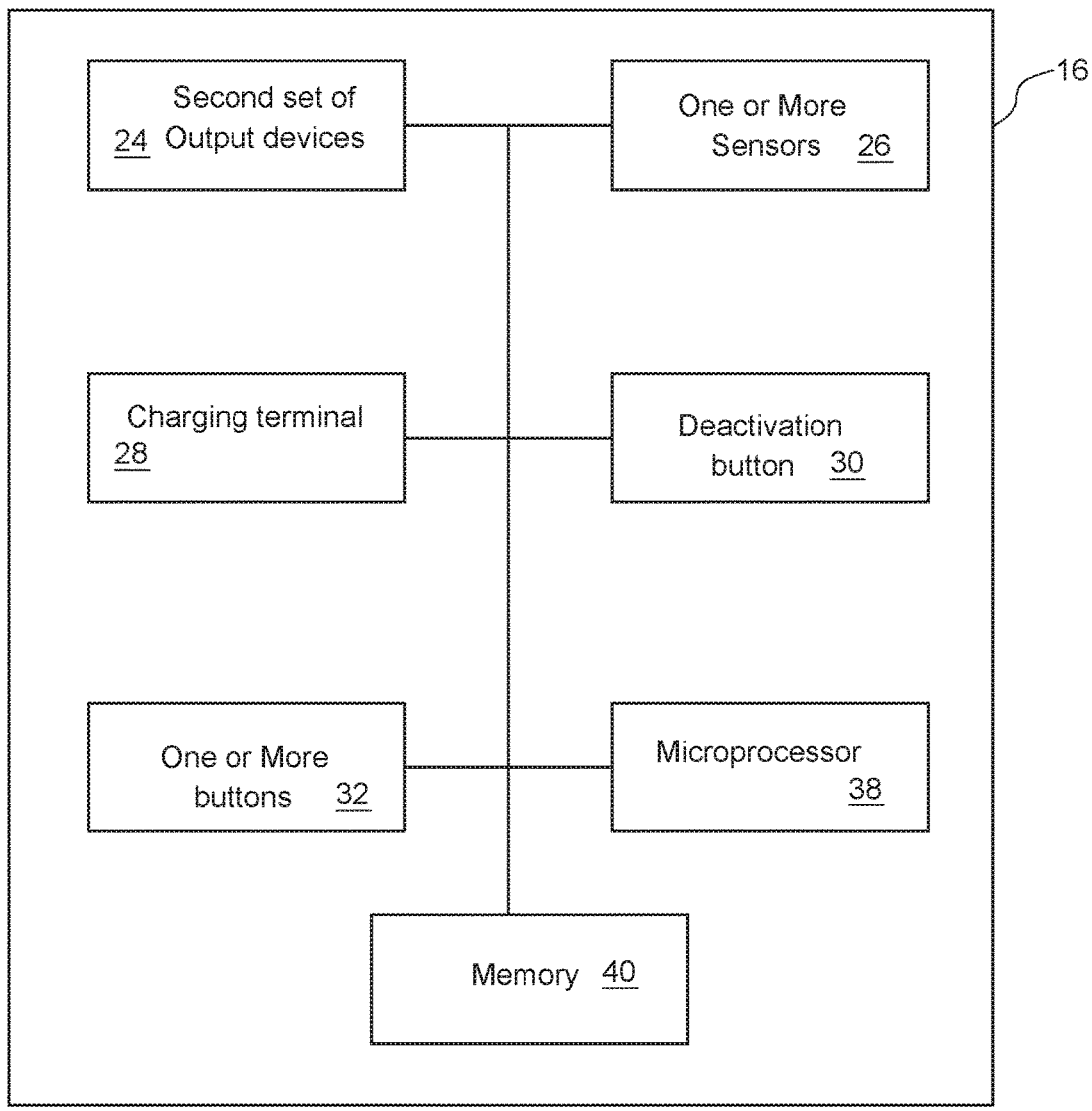
FIG. 3 demonstrates a block diagram of smart wearable accessory 12, according to various embodiments described herein.

FIG. 3 demonstrates a block diagram of smart wearable accessory 12, according to various embodiments described herein. Smart wearable accessory 12 may include a microprocessor 38, a memory 40, in addition to battery pack 18, first set of output devices 24, one or more sensors 26, and deactivation button 30 as described in FIG. 1.

Second set of output devices 24 may be devices that may be configured to generate feedback signals to alert associated user about a scenario described in FIG. 1. For example, second set of output devices 24 may include an audio beeper that may generate beeps upon activation by microprocessor 38. Rendering pattern of audio beeps and plurality of pre-recorded music files that may be retrieved by microprocessor 38 from memory 40 based on a selection provided by a user via one or more buttons 32.

One or more sensors 26, such as contact sensor, proximity sensor or pressure sensor, may be configured to detect an event associated with smart wearable accessory 12 and generate a signal. Event may correspond to non-contact of mobile device 34 from housing 22 of buckle portion 16. Generated signal may cause microprocessor 38 to activate, for example at least first set of output devices 20 and second set of output devices 24, based on detected event.

Charging terminal 28 may be configured to supply power supply to smart wearable accessory 12 based on power received from battery pack 18. Battery pack 18 may be configured to provide power to plurality of electronic and electrical components of smart wearable accessory 12. In an embodiment, battery pack 18 may be charged from an external power supply via a power cable (not shown). In an embodiment, battery pack 18 may be a lithium-ion battery that is small, durable, and having long life. Alternatively, battery pack 18 may be a rechargeable battery that may be recharged when power level drops below a threshold power level. Battery pack 18 may be installed on belt portion 14 and configured to supply power to charging terminal 28.

Microprocessor 38 may be configured to activate plurality of electronic units, such as first set of output devices 20 and second set of output devices 24, based on signal received from one or more sensors 26. Microprocessor 38 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

Memory 40 may be configured to temporarily store various data, such as rendering pattern of audio beeps and plurality of pre-recorded music files that may be retrieved by microprocessor 38 based on a selection provided by a user via one or more buttons 32, as illustrated in FIG. 1.

Figure 4:
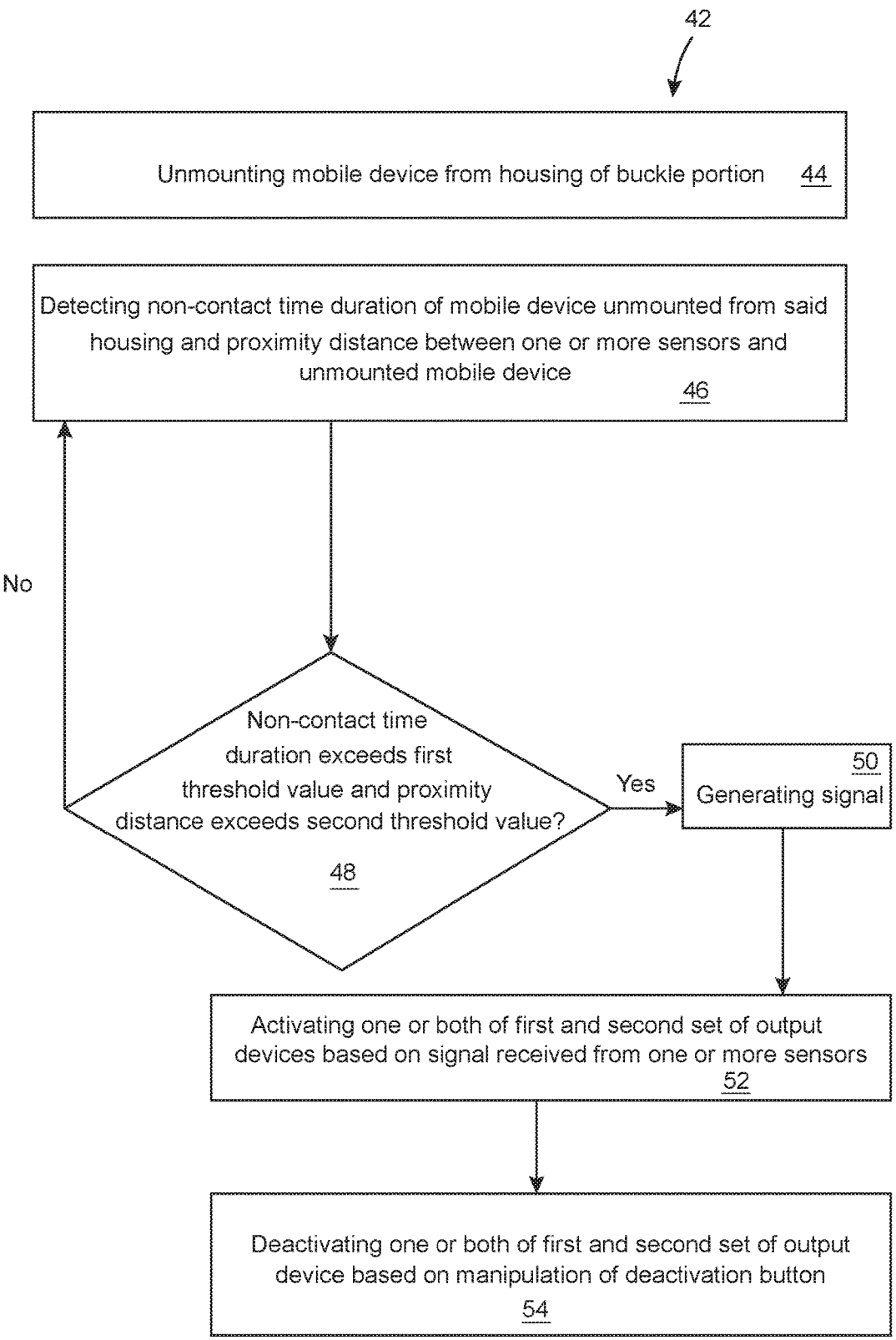
FIG. 4 is a flowchart for illustrating a method implemented by smart wearable accessory 12, according to an embodiment described herein.

FIG. 4 is a flowchart 42 for illustrating a method implemented by smart wearable accessory 12, according to an embodiment described herein.

At step 44, an event associated with mounted smart wearable accessory 12 may be detected by one or more sensors 26. Event may correspond to unmounting mobile device 34 from housing 22 of buckle portion 16. Mobile device 34 may be unmounted from housing 22 to perform a task, such as placing a call, attending a call, typing a message, interacting with an app, or the like In various embodiments, smart wearable accessory 12 may be worn by user as, for example, but not limited to, a waist belt or an arm belt.

Prior to unmounting of mobile device 34, one or more sensors 26 positioned at proximal surface 22A of housing 22 are abutted with a front or back surface of mobile device 34. As one or more sensors 26 are in contact with mobile device 34, no signal is generated prior to step 44.

At step 46, non-contact time duration of mobile device 34 unmounted from said housing 22 and proximity distance between unmounted mobile device 34 and one or more sensors 26 may be detected by one or more sensors 26.

At step 48, it may be determined whether non-contact time duration of mobile device 34 unmounted from said housing 22 exceeds first threshold value, and proximity distance between unmounted mobile device 34 and one or more sensors 26 exceeds second threshold value. In an embodiment, non-contact time duration of mobile device 34 unmounted from said housing 22 exceeds first threshold value, and proximity distance between unmounted mobile device 34 and one or more sensors 26 exceeds second threshold value. For example, a user has forgotten to pick his mobile device 34 while leaving his place, as described in first operating environment 10A. Thus, non-contact time duration of mobile device 34 unmounted from said housing 22 has exceeded first threshold value, for example "10 seconds". Further, proximity distance between unmounted mobile device 34 and one or more sensors 26 has exceeded second threshold value, for example "5 feet". In such a case, control passes to step 50.

In another embodiment, non-contact time duration of mobile device 34 unmounted from said housing 22 does not exceed first threshold value and/or proximity distance between unmounted mobile device 34 and one or more sensors 26 does not exceed second threshold value. For example, user has willingly unmounted mobile device 34 from housing 22 to perform a task, such as placing a call, attending a call, typing a message, interacting with an app, or the like, as described in second operating environment 10B. Thus, non-contact time duration of mobile device 34 unmounted from said housing 22 has exceeded first threshold value, for example "10 seconds". However, proximity distance between unmounted mobile device 34 and one or more sensors 26 has not exceeded second threshold value, for example "5 feet". In such a case, control passes back to step 46.

At step 50, a signal may be generated by one or more sensors 26 when non-contact time duration of mobile device 34 unmounted from said housing 22 exceeds first threshold value, and proximity distance between one or more sensors 26 and unmounted mobile device 34 exceeds second threshold value.

At step 52, one or both of first set of output devices 20 and second set of output devices 24 may be activated by microprocessor 38 based on signal received from one or more sensors 26.

At step 54, activated one or both of first set of output devices 20 and second set of output devices 24 may be deactivated based on manipulation of deactivation button 30. In an embodiment, deactivation button 30 may be manipulated automatically when mobile device 34 is mounted back within housing 22. In another embodiment, deactivation button 30 may be manipulated manually by user. Manipulation of deactivation button 30 may deactivate the activated one or both of said first set of output devices 20 and second set of output devices 24. In an embodiment, one or more other devices 36, such as wireless headphones or earphones, may be communicatively coupled with mobile device 34 via communication network, such as Bluetooth network.

Thus, smart wearable accessory 12 provides a smart and simple way to keep mobile devices always safe with the owner.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A smart wearable accessory, comprising:
    a belt portion having a first end and a second end, said belt portion comprising a first set of output devices positioned at one or more points at said belt portion; and
    a buckle portion having a housing upon which a mobile device is mounted, said housing comprising:
        a charging terminal configured to be electrically connectable with said mobile device for supplying power to said mobile device when mounted;
        one or more sensors configured to generate a signal when non-contact time duration of said mobile device when unmounted from said housing exceeds a first threshold value, and proximity distance between said one or more sensors and said unmounted mobile device exceeds a second threshold value;
        a second set of output devices positioned at said buckle portion; and
        a microprocessor configured to activate one or both of said first set of output devices and said second set of output devices based on said signal received from said one or more sensors.

2. The smart wearable accessory of claim 1, wherein said smart wearable accessory is worn by a user as a waist belt or an arm belt.

3. The smart wearable accessory of claim 1, wherein said buckle portion has at least two parallel opposite edges, wherein a first edge is adjustably secured with said first end and a second edge is adjustably secured with said second end of said belt portion.

4. The smart wearable accessory of claim 1, wherein said one or more sensors are positioned at a proximal surface of said housing, wherein said proximal surface of said housing is configured to be abutted with a back surface of said mobile device.

5. The smart wearable accessory of claim 1, wherein said housing is positioned at proximal surface of said buckle portion.

6. The smart wearable accessory of claim 1, wherein said housing is positioned at distal surface of said buckle portion.

7. The smart wearable accessory of claim 1, further comprising a deactivation button configured to be manipulated when said mobile device is mounted within said housing, wherein said manipulation of said deactivation button deactivates said activated one or both of said first set of output devices and said second set of output devices.

8. The smart wearable accessory of claim 7, wherein said deactivation button is automatically or manually manipulated upon mounting said mobile device in said housing.

9. The smart wearable accessory of claim 1, wherein a rechargeable battery pack is installed on said belt portion and configured to supply power to said charging terminal.

10. The smart wearable accessory of claim 1, wherein one or more other devices are communicatively coupled with said mobile device via a communication network.

11. The smart wearable accessory of claim 10, wherein said communication network is one of a long distance communication network or a short distance communication network.

* * * * *